United States Patent [19]

Davis et al.

[11] 3,931,121

[45] Jan. 6, 1976

[54] PROCESS FOR ACCELERATING THE CURING OF POLYMERS WITH ORGANO CHLORONITROSO COMPOUNDS

[75] Inventors: Pauls Davis, Gibraltar; Herwart C. Vogt, Grosse Ile; Charles F. Deck, Trenton, all of Mich.

[73] Assignee: BASF Wyandotte Corporation, Wyandotte, Mich.

[22] Filed: Nov. 11, 1974

[21] Appl. No.: 522,614

[52] U.S. Cl. ........... 260/79.3 R; 260/80.7; 260/92.3; 260/92.8 A; 260/93.5 A; 260/93.7; 260/94.7 HA; 260/94.7 N; 260/94.8; 260/94.9 B; 260/94.9 CA; 260/94.9 GB; 260/768; 260/2.5 HA
[51] Int. Cl.² ...................... C08F 8/30; C08C 19/12
[58] Field of Search ... 260/94.9 B, 94.9 CA, 92.8 A, 260/93.7, 94.9 GB, 93.5 A, 94.7 N, 94.8, 80.7, 735, 79.3 R, 92.3, 94.7 HA

[56] References Cited
UNITED STATES PATENTS

| | | | |
|---|---|---|---|
| 2,157,997 | 5/1939 | Brous............................... | 260/92.8 A |
| 3,127,384 | 3/1964 | Sparks et al. .................. | 260/92.8 A |
| 3,207,721 | 9/1965 | Safford .......................... | 260/92.8 A |
| 3,723,404 | 3/1973 | Davis et al. ......................... | 260/93.7 |

Primary Examiner—Joseph L. Schofer
Assistant Examiner—F. R. Cervi
Attorney, Agent, or Firm—Norbert M. Lisicki; Bernhard R. Swick; Robert E. Dunn

[57] ABSTRACT

The process for curing polymers with chloronitroso compounds can be accelerated by incorporating metallic compounds as accelerators.

5 Claims, No Drawings

PROCESS FOR ACCELERATING THE CURING OF POLYMERS WITH ORGANO CHLORONITROSO COMPOUNDS

BACKGROUND OF THE INVENTION

1. Field of the Invention

This invention relates to a process of crosslinking organic polymers. More specifically, this invention relates to a process of accelerating the crosslinking by using metallic accelerators.

2. Prior Art

Known crosslinking systems for polymers generally have such undesirable features as working effectively only at highly elevated temperatures, requiring unsaturated polymers, or being adversely affected by air and moisture. The prior art is limited to teaching the preparation of chloronitrosylated polymers by incorporating the chloronitroso groups in the polymer itself. U.S. Pat. No. 3,723,404 teaches the preparation of chloronitrosylated polymers by reacting the polymer with nitrosyl chloride or chlorine and nitric oxide in the presence of a free radical catalyst and in the presence of a solvent. The resulting chloronitrosylated polymer may then be crosslinked by treatment with heat either in the presence or absence of any fillers. U.S. Pat. No. 3,763,134 teaches the preparation of chloronitrosylated polymers by reacting the polymer with nitrosyl chloride or chlorine and nitric oxide in a two-phase system employing fluorocarbons as the reaction medium. U.S. Pat. No. 3,472,822 teaches that halogenated nitroso compounds may be crosslinked with fluorinated olefins by using free radical curing agents such as organic peroxides. There is no teaching in the prior art of the use of metallic accelerators in crosslinking chloronitroso polymers.

SUMMARY OF THE INVENTION

Various polymers may be crosslinked by the use of polyfunctional chloronitroso compounds. These compounds are prepared by treatment of the corresponding polyfunctional oxime with a positive chlorine containing environment such as t-butyl hypochlorite or chlorine in aqueous hydrochloric acid solution. A procedure has been described by Diekmann and Luttke, Angew. Chem. 80, 395, (1968) in which the dioxime of 1,4-cyclohexanedione is reacted with t-butyl hypochlorite in trichloromethane. Treatment of the dioxime of 1,4-cyclohexanedione with concentrated HCl followed by reaction with chlorine gas has been described by Piloty and Steinbock, Chem. Ber. 35, 3101 (1902).

The types of polymers which may be crosslinked by chloronitroso compounds include hydrocarbon polymers which may be saturated, unsaturated, linear or branched, crystalline, or non-linear amorphous polymers, homopolymers, copolymers, terpolymers as for example polyethylene, polypropylene, polystyrene, styrene-butadiene rubber, butyl rubber, natural rubber, polybutadiene, polyisobutylene, ethylene-propylene copolymers, bis-1,4-polyisoprene, ethylene-propylene-dichloropentadiene terpolymer, and blends of these polymers with each other or non-hydrocarbon polymers can be modified with the chloronitroso containing compound. In addition to the hydrocarbon polymers, non-hydrocarbon polymers including copolymers, terpolymers, and so forth, can also be modified with the chloronitroso derivatives. Typical of these non-hydrocarbon polymers are the vinyl chloride polymers containing at least 10 mole percent of vinyl chloride such as polyvinyl chloride, vinyl chloride-vinyl acetate copolymers, vinyl chloride-vinylidene chloride copolymers, perfluoropropylene vinylidene fluoride, chlorinated natural rubber, sulfochlorinated polyethylene, and chlorinated polymers such as chloroprene, chlorinated butyl rubber, polyethylene, polypropylene and copolymers thereof.

It is often desirable to have a crosslinking agent which decomposes at a lower temperature or at a faster rate than is possible using the pure compound alone. It has been discovered in accordance with this invention that this may be accomplished by employing certain compounds as accelerators. The accelerators will generally not only increase the speed of the curing reaction but will also by their presence improve certain physical properties of the cured polymer. Thus, the accelerators are not catalysts in the true sense. The accelerators of this invention are compounds of copper, iron, cobalt and nickel.

DESCRIPTION OF THE PREFERRED EMBODIMENT

The polyfunctional chloronitroso compounds which are used as crosslinking agents in accordance with this invention have the following general formula:

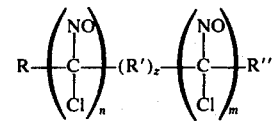

where R, R'' are organic radicals selected from the group consisting of hydrogen, methyl, ethyl, propyl, butyl, pentyl, hexyl, heptyl, octyl, nonyl, and decyl. R' is an organic radical selected from the group consisting of methylene, ethylene, propylene, butylene and pentylene, $n$ and $m$ are integers from 1 to 10 and $z$ is an integer from 0 to 2.

The crosslinking is carried out by contacting the polymer and a minor amount of the polyfunctional chloronitroso crosslinking agent for a time sufficient to obtain the desired degree of crosslinking. The amount of polyfunctional chloronitroso compound added will depend on the amount of crosslinking desired. While from 0.01 percent to about 50 percent by weight of the polymer of polyfunctional chloronitroso compounds can be employed it is preferred to use between 0.1 percent and about 10 percent by weight of the polymer.

In order to accelerate the crosslinking reaction or to accomplish the reaction at lower temperatures, metallic accelerators are added to the mixture of the hydrocarbon polymer and the chloronitroso compound. Among the metallic accelerators which may be employed are: copper chloride, copper sulfate, copper nitrate, copper acetate, copper bromide, copper fluoride, copper lactate, cobalt chloride, cobalt sulfate, cobalt acetate, cobalt bromide, cobalt fluoride, cobalt nitrate, iron powder, iron bromide, iron chloride, iron fluoride, iron nitrate, iron sulfate, ferrous ammonium sulfate, nickel acetate, nickel chloride, nickel bromide, nickel fluoride, nickel iodide and nickel sulfate. Those accelerators which are preferred are: copper sulfate, copper chloride, iron powder, iron chloride, cobalt acetate, nickel bromide, and ferrous ammonium sulfate.

A simple expedient procedure to check the influence of various accelerators is to mix small amounts of the accelerator with the crosslinking agent and determine the decomposition or melting point of the mixture. Any metallic compound which lowers the decomposition temperature or melting point of the chloronitroso compound may be employed as an accelerator. This effect is shown in Table I below.

TABLE I

| Compound | Formula | Melting Point, °C. | Remarks |
| --- | --- | --- | --- |
| Cupric sulfate, anhydrous | $CuSO_4$ | 157–162 | Light blue powder melted with decomposition. |
| Ferric chloride | $FeCl_3$ | 85–90 | Formed tan paste, melted with gas evolution to yield light tan solid. |
| Cupric chloride | $CuCl_2$ | 155–160 | Light green powder, turned to solid black. |
| Iron powder | Fe | 135–137 | Light gray powder, vigorous decomposition. |
| Cobalt acetate | $Co(Ac)_2 \cdot 4H_2O$ | 183 | Pink powder, turning to lavender. |
| Nickel bromide | $NiBr_2$ | 205 | Light yellow powder, melted with decomposition. |
| Ferrous ammonium sulfate | $Fe_2(NH_4)_2(SO_4)_4 \cdot 12H_2O$ | 210 | White powder, melted with gas evolution. |

1 part of accelerator compound was mixed with three parts of 2,4-dichloro-2,4-dinitrosopentane to determine said melting point.

The metallic accelerator and chloronitroso derivatives may be incorporated in the polymer mixture in any desired fashion. For example they can be uniformly blended by simply milling on a conventional rubber mill or suspending in a solution containing the polymer. By either means they are distributed throughout the polymer and uniform crosslinking or other modification is rapidly effected at lower temperatures and faster times. Other means of mixing the metallic accelerators with the polymer will be apparent to those skilled in the art.

The amount of inorganic accelerator employed can range from 10 to 30 weight percent of the chloronitroso compound, preferably from 10 to 20 weight percent.

In addition to the metallic accelerators other additives can also be incorporated. The additives commonly used in rubber vulcanizates can be used here also as for example extenders, fillers, pigments, plasticizers, stabilizers, and so forth. Obviously there are many cases in which a filler is not required or desired.

The crosslinked polymers of this invention are hard, tough plastics which are substantially insoluble in various hydrocarbon solvents and chlorinated solvents such as chloroform, carbon tetrachloride, and methylene chloride. These polymers exhibit improved tensile properties over their uncured counterparts. The cured polymers which included the various accelerators display increased tensile strength and 500 percent modulus values. The cured polymers range from rubbery materials to hard plastics with a wide variety of uses, e.g., machine parts and potting compositions. They are useful in various applications such as for example as protective and decorative coatings for various substrates including wood, metals, paper and plastics, as ingredients of tires for motor vehicles, tubing, pipes and other rubber articles and the like.

The process of the present invention provides for accelerating the curing of a wide variety of high molecular weight saturated polymers prepared by the polymerization of monomers containing at least one carbon to carbon double bond. The polymers which are crosslinked by the process may be formed into sheets or films or fibers after incorporation of the accelerators before effecting a cure by heating. These shaped forms may be prepared by extruding the compounded stock through suitable dies. They may also be prepared by dissolving the compounded stock in a volatile solvent and laying down a layer of the solution and allowing the solvent to evaporate, or extruding a concentrated solution through a spinneret and the solution evaporated. The resulting films or fibers are then subjected to heat to crosslink or to cure. The compounded stock may be formed into thin sheets on roller mills and the sheets taken off as unsupported films. If desired the films may be calendered onto substrates and the composite heated to vulcanize or crosslink the polymers.

The polymers which are crosslinked according to the present invention may be used generally in a fashion similar to polymers which have been crosslinked by known conventional curing procedures. However, the crosslinking process of the present invention yields polymers which tend to be more solvent resistant. The vulcanized polymers may be used for injection molding, electrical insulation, supported and unsupported films and fibers, wrapping materials, and so forth. The polymers may be varied by the incorporation of compounding ingredients at the time the accelerating agents are incorporated in the polymer. Suitable compounding ingredients are carbon black, pigments, stearic acid, and so forth.

Mixing of the accelerating agent with liquid polymers can be accomplished in dough mixers, high speed impeller mixers, paddle-type mixers and the like. For best results it is often preferred that further mixing be effected by the use of a three-roll mill such as is used in paint and ink manufacture. When a solid polymer is to be cured, the accelerating agent may be dispersed on a rubber mill or in an internal mixer such as a Banbury mixer.

In mixing the accelerating agent and the chloronitroso compound with either fluid polymers or millable gums the temperature must be kept below the decomposition point of the accelerating and crosslinking agent to prevent premature curing. The decomposition points of the accelerating and chloronitroso compounds are a function of the particular compounds employed and the polymer in which the compounds are dispersed. The temperatures utilized during the curing of the polymer is from about 30°C. to about 300°C. While the temperature is not particularly critical it must be above the temperature at which the mixture of accelerating agent and chloronitroso compound decomposes in the system being cured. This temperature will of course vary with each particular mixture.

Full curing of the polymers ordinarily takes from about one minute to about 24 hours, depending upon the temperatures employed. Preferred curing times range from 0.5 hour to 12 hours at temperatures ranging from about 75°C. to about 205°C. At these preferred curing temperatures sufficient cure to permit demolding occurs within from about 5 seconds to 5 minutes. This is due to the fast reactivity of the mixture of accelerating agent and chloronitroso compound once decomposition occurs. The present invention provides unlimited time for mixing, prolonged storage of the mixture and for filling the most complex molds. The curing equipment and curing procedures used in the present invention are conventional.

Infusible, insoluble, thermoset foams may be prepared by incorporating blowing agents in the compounded mixtures. In preparing these foams the hydrocarbon polymer is first blended with select additives, the chloronitroso containing crosslinking agent, the desired accelerator and a blowing agent. Any desired means can be used to bring about this blending. A two-roll rubber mill or a Banbury mixer may be employed. A convenient method for forming the desired expandable blend is to mix the starting polymer with the desired additives, pass the mixture through an extruder, chop the extruded material into pellets and then soak the pellets in the solvent blowing agent until the desired amount of the latter has been absorbed. The blowing agent can be mixed with a diluent, which can also contain a stabilizer or other modifier for the pretreated polymer and then the polymer in finely divided form can be added and mixed into a slurry. On evaporation of the diluent an intimate mixture of the polymer and blowing agent is obtained. This mixture is then heated at a temperature sufficient to release the gas from said blowing agent and to effect the crosslinking of the polymer. The temperatures employed are in the range of 50° to 250°C.

Any of the well-known chemical and solvent blowing agents can be used in the preparation of the foams. Illustrative chemical blowing agents include azobis(formamide), azodicarbonamide, diazoaminobenzene, N,N'-dinitrosopentamethylene tetramine, N,N'-dimethyl-N,N'-dinitrosoterephthalamide, p,p'-oxybis(-benzenesulfonyl semi-carbazide), azobis(isobutyronitrile), p,p'oxybis(benzenesulfonyl hydrazide), p,p'diphenyl-bis(sulfonyl hydrazide), benzenesulfonyl hydrazide, m-benzene-bis(sulfonyl hydrazide). Illustrative solvent blowing agents include fluorocarbons such as tetrafluoromethane, bromotrifluoromethane, chlorotrifluoromethane, dibromodifluoromethane, dichlorodifluoromethane, trichlorofluoromethane, hexafluoroethane, 1,2,2-trichloro-1,1,2-trifluoroethane, 1,1,2,2-tetrachloro-1,2-difluoroethane, 1,2-dibromo-1,1,2,2-tetrafluoroethane, 1,2,2-tribromo-1,1,2-trifluoroethane, octafluoropropane, decafluorobutane, hexafluorocyclopropane, 1,2,3-trichloro-1,2,3-trifluorocyclopropane, octafluorocyclobutane-1,1,2-dichloro-1,2,3,3,4,4-hexafluorocyclobutane, 1,2,3,4-tetrachloro-1,2,3,4-tetrafluorocyclobutane, trichloroethylene, chloroform, carbon tetrachloride, and low boiling hydrocarbons, such as butane, pentane, hexane, and toluene. Inorganic blowing agents such as metal halides, alkaline and alkali earth carbonates, bicarbonates, ammonium carbonates and bicarbonates may also be employed in the subject invention as well as various forms of ammonium nitrite. Accordingly, any compound which decomposes or volatilizes to yield at least one mole of gas per mole of blowing agent at a temperature of 250°C. or less can be used.

The following examples are illustrative of the present invention and therefore are not intended in any way as a limitation on the scope thereof. Parts and percents are by weight unless otherwise indicated. These examples illustrate the cured polymers obtained when various polymers are cured both in the absence and presence of the metallic accelerators.

The following ASTM methods were employed for determining the physical properties of the cured polymers prepared in the subsequent Examples.

| | |
|---|---|
| Modulus at 100% Elongation | D412 |
| Modulus at 200% Elongation | D412 |
| Modulus at 300% Elongation | D412 |
| Modulus at 500% Elongation | D412 |
| Tensile at break | D412 |
| Elongation at break | D412 |
| Yield Point | D412 |

EXAMPLE 1

Three samples of a chlorinated polyethylene resin have the following typical property values:

| | |
|---|---|
| Melt viscosity, poises/1000 | 24 |
| Bulk density, lbs./cu.ft. | 28 |
| Chlorine content, % | 36 |
| Residual crystallinity, % | 0-2 |
| Typical screen analysis: | |
| % retained on 12 mesh | 5 |
| % through 40 mesh | 5 |
| Volatiles, % maximum | 0.2 | was compounded according to the following recipe:
100 parts chlorinated polyethylene resin
10 parts magnesium oxide
1 part stearic acid
40 parts carbon black
3.5 parts 2,2,4,4-tetramethyl-1,3-dichloro-1,3-dinitrosocyclobutane Each formulation was compounded on a two roll mill by conventional rubber procedure and then cured in a preheated metal mold at a temperature of 150°C. for ½, 1, and 2 hours. The resulting vulcanizates were odorless. The properties of the vulcanizates were determined and set forth in Table II. The resulting products were hard, tough rubbers, having no yield point, which were completely gelled and were substantially insoluble in boiling carbon tetrachloride and chlorobenzene.

TABLE II

| Run | Mold Time, hours | Tensile Strength psi | 500% Modulus psi | 300% Modulus psi | 100% Modulus psi | % Elongation |
|---|---|---|---|---|---|---|
| 1 | ½ | 2153 | 1977 | 1070 | 441 | 603 |
| 2 | 1 | 2703 | 2566 | 1416 | 724 | 580 |
| 3 | 2 | 2166 | 2054 | 1140 | 453 | 574 |

EXAMPLE 2

In a control run, the above procedure as described in Example 1 was duplicated, except that no chloronitroso containing material was added to the chlorinated polyethylene resin. The properties of these formulated resins after subjection to heat were determined and set forth in Table III. The resulting products had little, if any, gel content and were readily soluble in boiling carbon tetrachloride and chlorobenzene.

TABLE III

| Run | Mold Time, hrs. | Tensile Strength psi | 500% Modulus psi | 300% Modulus psi | 100% Modulus psi | % Elongation | Yield Point |
|---|---|---|---|---|---|---|---|
| 4 | ½ | 1803 | 1146 | 627 | 393 | 771 | 338 |
| 5 | 1 | 1349 | 970 | 555 | 348 | 796 | 288 |

EXAMPLE 3

Three samples of a chlorinated polyethylene resin having the typical properties described in Example 1, were crosslinked with 2,4-dichloro-2,4-dinitrosopentane. The formulations for these examples were as follows:

100 parts chlorinated polyethylene resin
10 parts magnesium oxide
1 part stearic acid
40 parts carbon black
2.93 parts 2,4-dichloro-2,4-dinitrosopentane The ingredients were compounded on a two roll mill at a temperature between 25°–35°C. for 15 minutes and then cured in a preheated mold at a temperature of 150°C. for varying times. The resulting vulcanizates were odorless and were completely gelled, being substantially insoluble in boiling carbon tetrachloride and chlorobenzene. Typical physical properties were determined and set forth in Table IV. No yield point for these vulcanizates was observed.

TABLE IV

| Run | Mold Time, hrs. | Tensile Strength psi | 500% Modulus psi | 300% Modulus psi | 100% Modulus psi | % Elongation |
|---|---|---|---|---|---|---|
| 6 | ½ | 1774 | 1661 | 956 | 476 | 568 |
| 7 | 1 | 1833 | 1734 | 1021 | 478 | 587 |
| 8 | 2 | 1617 | 1597 | 1009 | 500 | 542 |

EXAMPLE 4

Two samples of a synthetic fluoroelastomer, perfluoropropylene-vinylidene fluoride, having the following typical properties values:

| | |
|---|---|
| Specific gravity | 1.86 |
| Mooney Viscosity, ML-4 at 212°F. (typical sample) | |
| Original | 117 |
| After cold milling | |
| 10 minutes | 117 |
| 20 minutes | 118 |
| 30 minutes | 118 |
| Appearance | White, translucent |
| Odor | None |
| Solubility | Low molecular weight ketones | were formulated according to the following recipe:

| | Run 9 | Run 10 |
|---|---|---|
| Fluoroelastomer | 100 parts | 100 parts |
| Carbon black | 18 parts | 18 parts |
| Magnesium oxide | 15 parts | 15 parts |
| 2,4-dichloro-2,4-dinitrosopentane | 2.9 | — |
| Iron powder | 0.08 | — |

The ingredients were compounded on a two roll mill and then cured at 150°C. for 1 hour followed by 200°C. for 24 hours. Typical physical properties were determined and set forth in Table V.

TABLE V

| | Run 9 | Run 10 |
|---|---|---|
| Tensile strength, psi | 1195 | 268 |
| 100% Modulus | 380 | — |
| % Elongation | 375 | — |
| Boiling methylethyl ketone | Insoluble | Soluble |

The vulcanized elastomer, Run 9, had no elongation set. It is noted that Run 10 is a control run made in exactly the same manner, except that no chloronitroso containing crosslinking agent was added to the polymer and produced an elastomer which was completely soluble in methyl ethyl ketone.

EXAMPLE 5

Three samples of chlorinated polyethylene were crosslinked with 2,4-dichloro-2,4-dinitrosopentane. In runs 11, 12, and 13, 0.055 parts of iron powder were added to the compounded mix, the remaining ingredients of carbon black, magnesium oxide and stearic acid were the same as described in Example 3. Each formulation was compounded on a two roll mill and then cured at 150°C. for varying lengths of time in a closed iron mold. The resulting vulcanizates were odorless. The properties of the vulcanizate are listed in Table VI.

TABLE VI

| Run | Mold Time, hrs. | Tensile Strength psi | 500% Modulus psi | 300% Modulus psi | 100% Modulus psi | % Elongation |
|---|---|---|---|---|---|---|
| 11 | ½ | 2106 | 1908 | 1056 | 501 | 597 |
| 12 | 1 | 2206 | 2092 | 1061 | 530 | 564 |
| 13 | 2 | 2106 | 2053 | 1290 | 558 | 535 |

The influence of the iron powder can readily be observed in the improved tensile strength and 500 percent modulus values for runs 11, 12 and 13.

EXAMPLE 6

Six samples of chlorinated polyethylene were crosslinked with 1,4-dichloro-1,4-dinitrosocyclohexane. In runs 17, 18 and 19, 0.06 parts of anhydrous cupric sulfate were added to the compounded mix, the remaining ingredients of carbon black, magnesium oxide and stearic acid were the same as described in Example 3. Each formulation was compounded on a two roll mill and then cured at 150°C. for varying lengths of time in a closed iron mold. The properties of the vulcanizates are listed below in Table VII.

TABLE VII

| Run | Mold Time, hrs. | Tensile Strength psi | 300% Modulus psi | 100% Modulus psi | % Elongation |
|---|---|---|---|---|---|
| 14 | ½ | 1771 | 1412 | 658 | 409 |
| 15 | 1 | 2353 | 1781 | 787 | 413 |
| 16 | 2 | 1894 | 1676 | 745 | 411 |
| 17 | ½ | 2163 | 1637 | 781 | 519 |
| 18 | 1 | 2451 | 1989 | 908 | 524 |
| 19 | 2 | 2067 | 1918 | 877 | 522 |

EXAMPLE 7

Six samples of chlorinated polyethylene were crosslinked with 1,4-dichloro-1,4-dinitrosocyclohexane. In runs 22 and 23 0.025 parts of iron powder and in runs 24 and 25 0.05 parts iron powder were added to the compounded mix, the remaining ingredients of carbon black, magnesium oxide and stearic acid were the same as described in Example 3. Each formulation was compounded on a two roll mill and then cured at 150°C. for varying lengths of time in a closed iron mold. The properties of the vulcanizates are listed in Table VIII.

TABLE VIII

| Run | Mold Time, hrs. | Tensile Strength psi | 300% Modulus psi | 100% Modulus psi | % Elongation |
|---|---|---|---|---|---|
| 20 | ½ | 1781 | 961 | 481 | 573 |
| 21 | 1 | 1838 | 1026 | 483 | 592 |
| 22 | ½ | 2126 | 1034 | 530 | 561 |
| 23 | 1 | 2194 | 1060 | 562 | 559 |
| 24 | ½ | 2260 | 1016 | 503 | 546 |
| 25 | 1 | 2171 | 1187 | 585 | 553 |

EXAMPLE 8

Two samples of a chlorinated polyethylene resin having the typical properties described in Example 1 were crosslinked with oxolohydroximoyl chloride.

The formulation for runs 26 and 27 were as follows:
100 parts chlorinated polyethylene resin
10 parts magnesium
1 part stearic acid
40 parts carbon black
2.3 parts oxalohydroximoyl chloride
0.055 part iron powder The ingredients were compounded on a two roll mill at a temperature between 25°–35°C. for 15 minutes and then cured in an unheated mold at a temperature of 93°C. for varying times. The resulting vulcanizates were completely gelled, being substantially insoluble in boiling carbon tetrachloride and chlorobenzene. Typical physical properties were determined and set forth in Table IX.

TABLE IX

| Run | Mold Time, hr. | Tensile Strength psi | 300% Modulus psi | 100% Modulus psi | % Elongation |
|---|---|---|---|---|---|
| 26 | ½ | 1874 | 1705 | 693 | 345 |
| 27 | 1 | 1874 | 1806 | 859 | 346 |

The embodiments of the invention in which an exclusive property or privilege is claimed are defined as follows:

1. A process for accelerating the curing of polymers selected from the group consisting of polyethylene, polypropylene, polystyrene, styrene-butadiene rubber, butyl rubber, natural rubber, polybutadiene, polyisobutylene, ethylene-propylene copolymers, bis-1,4-polyisoprene, ethylene-propylene dichloropentadiene terpolymer, polyvinyl chloride polymer, vinyl chloride-vinyl acetate copolymers, vinyl chloride-vinylidene chloride copolymers polyperfluoropropylene vinylidene fluoride, chlorinated natural rubber, sulfochlorinated polyethylene, polychloroprene, chlorinated butyl rubber, chlorinated polyethylene and chlorinated polypropylene, wherein said polymers are crosslinked with polyfunctional chloronitroso groups in the presence of a metallic or metallic salt accelerator selected from the group consisting of anhydrous cupric sulfate, ferric chloride, cupric chloride, nickel bromide, and iron powder, cobalt acetate tetrahydrate and ferrous ammonium sulfate dodecahydrate.

2. The process of claim 1 wherein said polymers are crosslinked at a temperature range of from about 30°C. to about 300°C.

3. The process of claim 1 wherein the concentration of the chloronitroso compound is from about 0.1 to about 10 weight percent of the weight of said polymer.

4. The process of claim 1 wherein the concentration of the metallic salt accelerator is from about 10 to about 30 weight percent of the weight of the chloronitroso compound.

5. The process of claim 1 wherein the concentration of the iron powder accelerator is from about 1 to about 3 weight percent of the weight of the chloronitroso compound.

* * * * *